US009389961B1

(12) United States Patent
Patankar et al.

(10) Patent No.: US 9,389,961 B1
(45) Date of Patent: Jul. 12, 2016

(54) AUTOMATED NETWORK ISOLATION FOR PROVIDING NON-DISRUPTIVE DISASTER RECOVERY TESTING OF MULTI-TIER APPLICATIONS SPANNING PHYSICAL AND VIRTUAL HOSTS (71) Applicant: Symantec Corporation, Mountain View, CA (US)

(72) Inventors: Swapnil Patankar, Thane (IN); Shrikant Ghare, Pune (IN)

(73) Assignee: Veritas Technologies LLC, Mountain View, CA (US)

( * ) Notice: Subject to any disclaimer, the term of this patent is extended or adjusted under 35 U.S.C. 154(b) by 97 days.

(21) Appl. No.: 14/503,392

(22) Filed: Sep. 30, 2014

(51) Int. Cl.
*G06F 11/26* (2006.01)
*G06F 11/14* (2006.01)
*G06F 11/20* (2006.01)
*G06F 17/30* (2006.01)
*H04L 29/06* (2006.01)

(52) U.S. Cl.
CPC ........ *G06F 11/1448* (2013.01); *G06F 11/2028* (2013.01); *G06F 11/2097* (2013.01); *G06F 17/30575* (2013.01); *H04L 63/02* (2013.01)

(58) Field of Classification Search
CPC .................................................. G06F 11/2097
USPC .................................................. 714/4.11, 6.3
See application file for complete search history.

(56) References Cited

U.S. PATENT DOCUMENTS

2002/0049803 A1* 4/2002 Bandhole ................ H04L 29/06
718/104
2010/0312592 A1* 12/2010 Sallakonda ............ G06Q 10/10
705/7.37
2015/0324260 A1* 11/2015 Mutalik ................ G06F 11/203
714/703
2016/0048408 A1* 2/2016 Madhu ................ G06F 11/1458
718/1

* cited by examiner

Primary Examiner — Chae Ko
(74) Attorney, Agent, or Firm — Campbell Stephenson LLP (57) ABSTRACT Various systems, methods and apparatuses for creating network isolation spanning physical and virtual hosts are presented. In one embodiment, network isolation may be created between a primary (e.g., production) site and a secondary (e.g., a disaster recovery or sandbox) site. The network isolation allows testing (or other uses) on the secondary site to be non-disruptive to the normal operations of the sites, including the ability to failover during testing. Such non-disruptive network isolation allows certain communications to continue, especially communications between ports having replicated data. The network isolation may be customized in various other ways to allow certain communications to continue while preventing other communications. This invention can be used to validate application readiness, as well as to validate data correctness of individual tiers, and may be used with systems that contain multiple tiers, and include physical hosts, virtual hosts, and/or combinations of both.

20 Claims, 8 Drawing Sheets

AUTOMATED NETWORK ISOLATION FOR PROVIDING NON-DISRUPTIVE DISASTER RECOVERY TESTING OF MULTI-TIER APPLICATIONS SPANNING PHYSICAL AND VIRTUAL HOSTS

FIELD OF THE INVENTION

This invention relates to disaster recovery testing, more particularly, to non-disruptive testing for disaster recovery readiness.

DESCRIPTION OF THE RELATED ART

With the increase in e-commerce in recent years, the need for more robust and complex data centers has followed suit. Traditionally, businesses were often able to host all of the components of an online service on a single physical server. For instance, an online service including a web server, an application, and an underlying database were often all hosted on the same physical server. However, as the size and complexity of these online services has grown, such traditional methods became less-than-optimal at best, and sometimes completely untenable at worst.

As a result, many entities have begun to specialize the data centers that host online businesses (or other aspects of an entity's online presence) in order to optimize the components of those data centers. One common way to optimize those data centers is to deploy each of the components in separate tiers, often resulting in distinct hardware and software requirements for each tier. As a result, however, this optimization often leads to additional complexity. For instance, each tier may be optimized to use a different operating system, and may be deployed on a different physical machine. As one example, the web component may be deployed in a web tier using a virtual machine (such as, e.g., those available from VMware®), the application component may be deployed in an application tier using an enterprise application (such as, e.g., Red Hat® Enterprise Linux®), and the database component may be deployed in a database tier using a software platform optimized for database functionality (such as, e.g., IBM's AIX® operating system). As can be seen from this example, a multi-tier application may include (and must be able to handle) various types of components, such as physical computing environments, virtual computing environments, and "hybrid" mixtures of physical and virtual computing environments.

In addition to structuring the primary (e.g., "production") site in this manner, the primary site system also needs to be mimicked on a secondary (e.g., "disaster recovery" or "failover") site. This secondary site must be ready to come online, or "failover," at a moment's notice if the primary site "crashes" or is otherwise taken offline or goes offline. So that the operations of the multi-tier application can adequately "failover" to the secondary site, the secondary site must include the same configuration, and have access to the same data, as the primary site. Thus, the secondary site faces many of the same complexities as the primary site.

To ensure that the secondary site is adequately configured and ready to come online at a moment's notice, it is necessary to test the readiness of the secondary site to be ready to failover should that need arise. However, such testing presents many of its own challenges. For example, since the secondary site must be able to mimic the primary site, the secondary site may also consist of physical, virtual, and hybrid computing environments. Thus, any testing must be able to test such configurations. Additionally, any such testing must be done in a manner that is not disruptive to either the primary site or to the secondary site itself. Moreover, any such testing of the secondary site must also not disrupt any other functionality of the secondary site, such as communication with one or more additional primary sites. Despite these challenges, the testing procedure must be able to test the failover multi-tier application on the secondary site with respect to the readiness of both the failover multi-tier application itself, as well as with respect to the underlying data for use by the failover multi-tier application.

SUMMARY OF THE INVENTION

Various systems, methods and apparatuses for creating network isolation spanning physical and virtual hosts are presented. In one embodiment, for example, network isolation may be created between a primary site and a secondary site. The primary site may be a production site. In one embodiment, the secondary site may be a disaster recovery (or "failover") site. In one embodiment, the secondary site may be a site used, at least in part, for testing software, configurations of a website, or other testing functionality. In one embodiment, the secondary site may be a site used, at least in part, to train employees or other personnel. Other embodiments can also be deployed based on the purposes, uses, configurations, and/or other requirements of the primary and/or secondary sites.

The testing (and other uses) discussed herein should be non-disruptive to both the primary site(s) and any secondary sites involved. Thus, regardless of the specific configurations of the primary and secondary sites, the network isolation can allow testing (or other uses, such as training of personnel) of the secondary site without affecting the normal operation of the primary site and also without affecting the normal operation of the secondary site. In embodiments in which the secondary site is, at least in a part, a disaster recovery site, the network isolation allows for testing (or other uses) of the secondary site without affecting the ability of the disaster recovery site to come online (e.g., "fail over") or perform other functionality during the testing.

Network isolation can be created without disrupting the normal operation of either the primary site or the secondary site. In one embodiment, network isolation may be created between the primary site and the secondary site while still allowing certain communications to continue, such as communications between certain ports, especially, e.g., ports that have replicated data. As is discussed in more detail herein, the network isolation may be customized in various other ways to allow certain communications to continue while preventing other communications. The network isolation may be created without the need for any additional hardware or software.

The functionality described herein can be used to validate application readiness, as well as to validate data correctness of individual tiers. The network isolation disclosed herein may be used with systems that contain multiple tiers, and include physical hosts, virtual hosts, and/or combinations of physical and virtual hosts. In one embodiment, each of the tiers and/or hosts may contain multiple nodes, and may have data (including replicated data) associated with some, or each, tier, host, and/or node. In one embodiment, the primary and secondary sites may use multiple operating systems within each site (e.g., the production Web Tier (described below) may use a different operating system than the production Application Tier (also described below), etc.), and in at least some embodiments may use different operating systems than each other.

The functionality disclosed herein includes the functionality to configure, start (e.g., invoke), run, and stop a disaster recovery readiness test (e.g., fire drill) or to perform other testing or operations. The network isolation can be created prior to beginning the test or other operation, and then stopped/removed following the completion of the test or other operation (or when otherwise needed, such as, e.g., if the need to failover the secondary site arises during the testing or other operation). Should the need arise to failover the secondary site (particularly where the secondary site is a disaster recovery site) during the test, the testing (or other operation) can be stopped and the network isolation can be removed prior to the completion of the testing (or other operation).

The foregoing is a summary and thus contains, by necessity, simplifications, generalizations and omissions of detail, consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Introduction

As discussed above, modern data centers often include multi-tier applications. Such multi-tier configurations can be quite complex, as can the configurations of the secondary (e.g., "disaster recovery" or "failover") sites that must mimic the multi-tier configuration of a primary (e.g., "production") site. Despite these complexities, it is necessary to be able to adequately test the secondary site regardless of its structural configuration (e.g., physical, virtual, or hybrid) and without disrupting the normal operation of the primary site (or any other sites connected to the secondary site). Equally important is the ability to test the secondary site (or to use the secondary site for testing, training, or other uses) without disrupting the functionality of the secondary site itself, specifically without disrupting the ability for the secondary site to come online on a moment's notice should the primary site fail during the test.

In order to solve these and other problems, the need has arisen for a solution that can test the readiness of the secondary site to failover regardless of the structural configuration of the second site, and without disrupting the functionality of the primary site, the secondary site itself, or any sites connected to either of those sites. As discussed in more detail herein, a solution to these needs (as well as other needs) is presented in this disclosure. Among other aspects of this invention, the readiness testing solution disclosed herein can automatically create and remove customizable network isolation (e.g., a firewall), configure and run a test (e.g., fire drill) or other operation on a secondary site, and can stop the test (or other operation) and remove the network isolation, all without disrupting the normal functionality of the primary site, the secondary site itself, or any sites connected to either of those sites. Among other aspects of the network isolation, the invention disclosed herein allows for complete isolation between the primary and secondary sites, but does so with the ability to selectively allow the transfer of data between certain tiers, hosts, nodes and/or ports. Additionally, the network isolation disclosed herein does not require any configuration changes on the primary site, and does not require any downtime of the primary site. Moreover, neither the network isolation nor the testing (or other operations) on the secondary site will hamper the ability to do an actual failover should that need arise during the testing or other operations on the secondary site.

Disaster Recovery Readiness Testing

Disclosed herein are methods and systems for performing disaster recovery readiness testing, also known in the art as a disaster recovery "fire drill." More particularly, the methods and systems disclosed herein provide for performing disaster recovery readiness testing for a site having a multi-tier application. The methods and systems disclosed herein further provide for performing the test without disrupting the ability of the primary (e.g., production) site or the secondary (e.g., disaster recovery or "failover") site to function normally during the test. Moreover, although one embodiment of this invention discussed herein pertains to disaster recovery readiness testing, other embodiments of this invention also exist. As one example of an alternate embodiment, the invention disclosed herein can also be applied to a virtual "sandbox," which can be used, e.g., to train new employees or to test and configure new systems.

Figure 1:
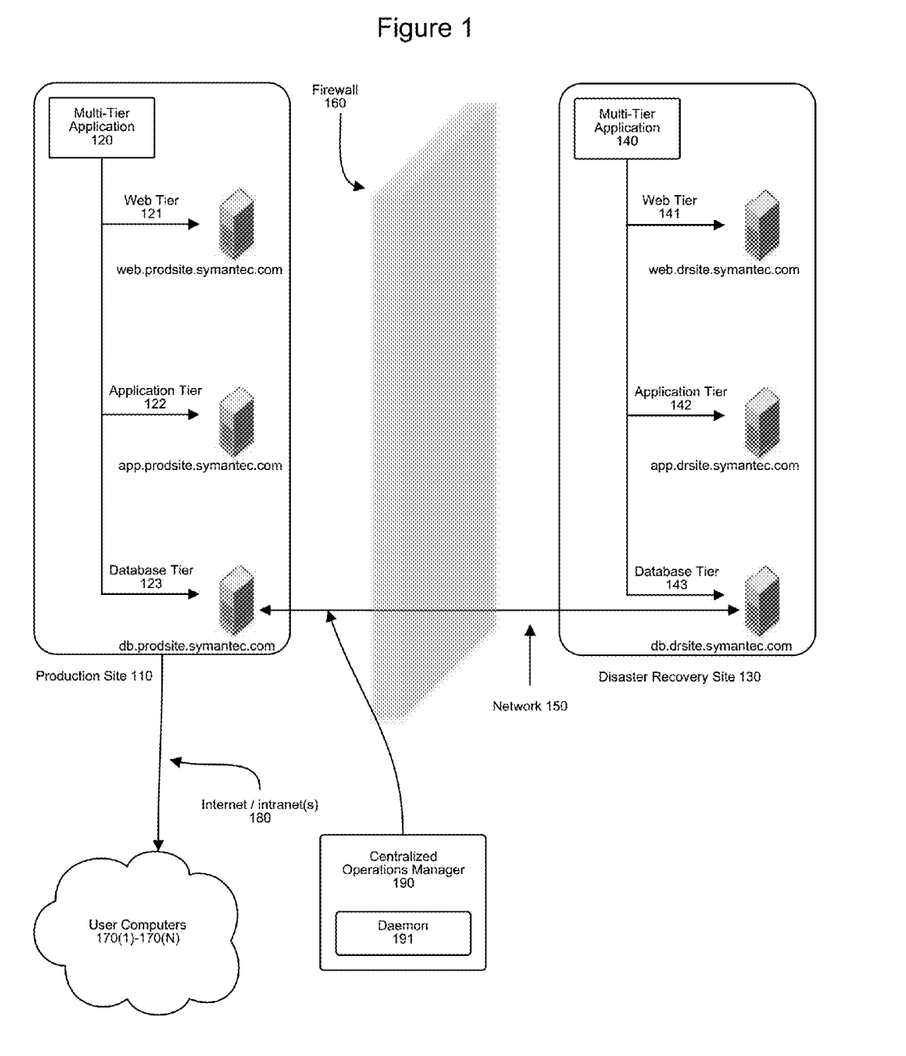
FIG. 1 is a block diagram of a multi-tier computing system including a primary (e.g., production) site, a secondary (e.g., disaster recovery) site, and a firewall, according to one embodiment of the present invention.

FIG. 1 is a block diagram of a multi-tier computing system including primary (e.g., production) site 110 and secondary (e.g., disaster recovery or failover) site 130 coupled through network 150. Generally speaking, production site 110 is the site that is currently actively being used to host the multi-tier application. Thus, production site 110 is the one on which user data is being produced, received, consumed, etc. (e.g., web transactions are affecting data in a financial or retail database) during the normal course of operation (e.g., absent a "failure" of the production site). Production site 110 includes production multi-tier application 120. In one embodiment, production multi-tier application 120 contains three tiers—in this example, Web Tier 121, Application Tier 122, and Database Tier 123. Each of these tiers can include, among other things, a daemon or script (such as daemons 128(1), 128(2), and 128(3), depicted in the enhanced version of production site 110 shown in FIG. 1A), the usage of which will be discussed elsewhere in this disclosure. Moreover, although not depicted in FIG. 1, each of these tiers may be implemented on a cluster of nodes, or a tier may be implemented on a single node. As is understood in the art, a "node" can be (or can be implemented on or by) any physical or virtual machine (e.g., a computer, laptop, desktop, workstation, server, smart phone, or any other computing device) that has or can have an IP address.

Figure 1A:
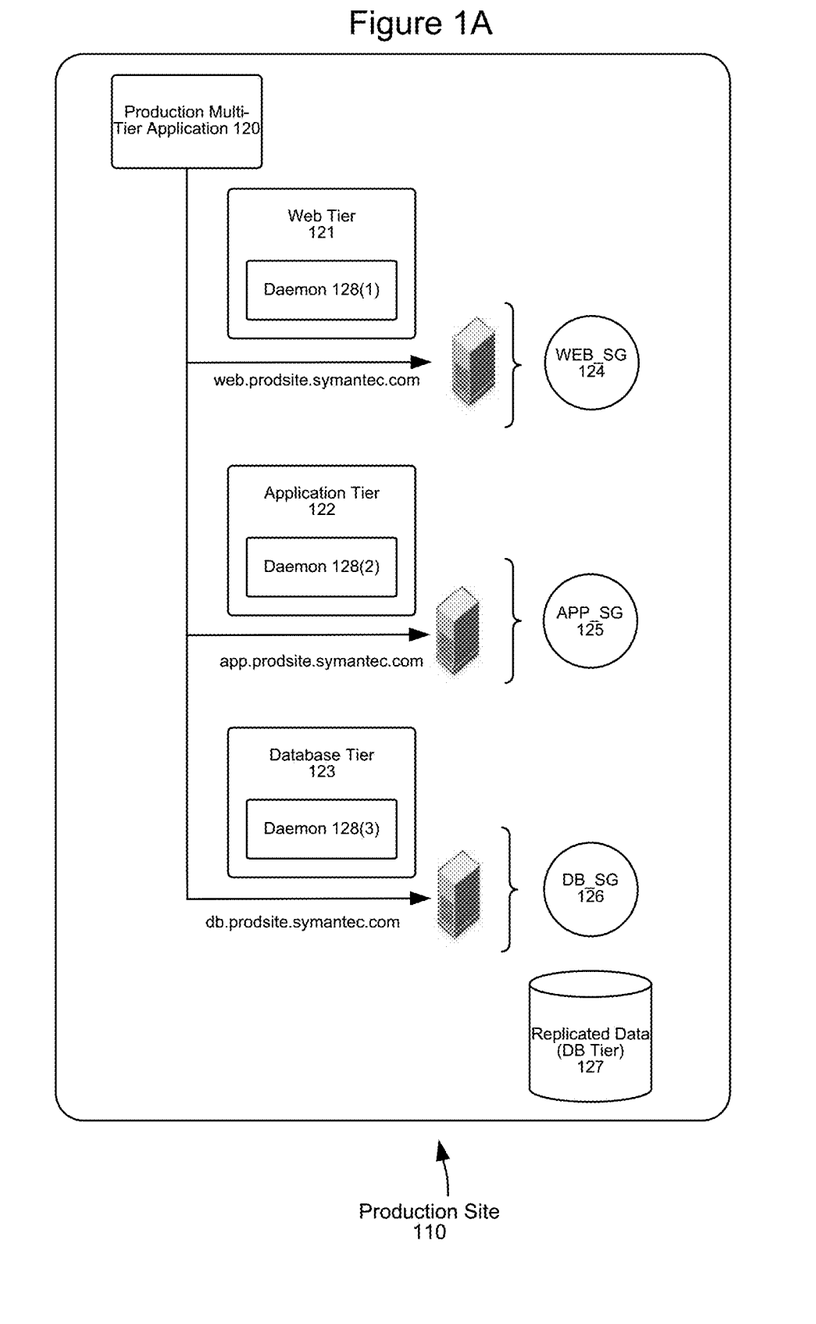
FIG. 1A is a block diagram showing additional details of the primary (e.g., production) site depicted in FIG. 1.

As depicted in FIG. 1A, each tier can include one or more service groups. Service groups can be thought of as "virtual containers" and can be used to manage group(s) of resources required to run an application. In one embodiment, for example, Web Service Group (WEB_SG) 124 can be used to manage the resources of Web Tier 121, Application Service Group (APP_SG) 125 can be used to manage the resources of Application Tier 122, and Database Service Group (DB_SG) 126 can be used to manage the resources of Database Tier 123. Collectively, WEB_SG 124, APP_SG 125 and DB_SG 126 manage the resources required to run production multi-tier application 120.

In contrast to production site 110, which is the "live" site being used to provide services to users, disaster recovery site 130 is "on standby," i.e., ready to take over the role of production site if production site 110 fails, crashes, is taken offline, goes offline, or becomes unavailable for any other reason. (collectively, "fails"). The process of switching the flow of traffic to disaster recovery site 130 if production site 110 "fails" can be referred to as "failover." In certain situations, failover may cause production site 110 and disaster recovery site 130 to switch roles, although that is not necessarily the case (e.g., if production site has failed in such a manner that it is no longer able to serve as even a disaster recovery site).

Accordingly, disaster recovery site 130 must be able to come online or "failover" if production site 110 "fails." As a result, disaster recovery site 130 should be able to mimic the essential functionality of primary site 110, especially the functionality of production multi-tier application 120. Accordingly, disaster recovery site 130 also includes disaster recovery multi-tier application 140, which should be configured to mimic production multi-tier application 120.

Also depicted in FIG. 1A is replication data 127, which in this example is data that was replicated from production Database Tier 123. In other embodiments, any production site tier may have replicated data associated with it.

Figure 1B:
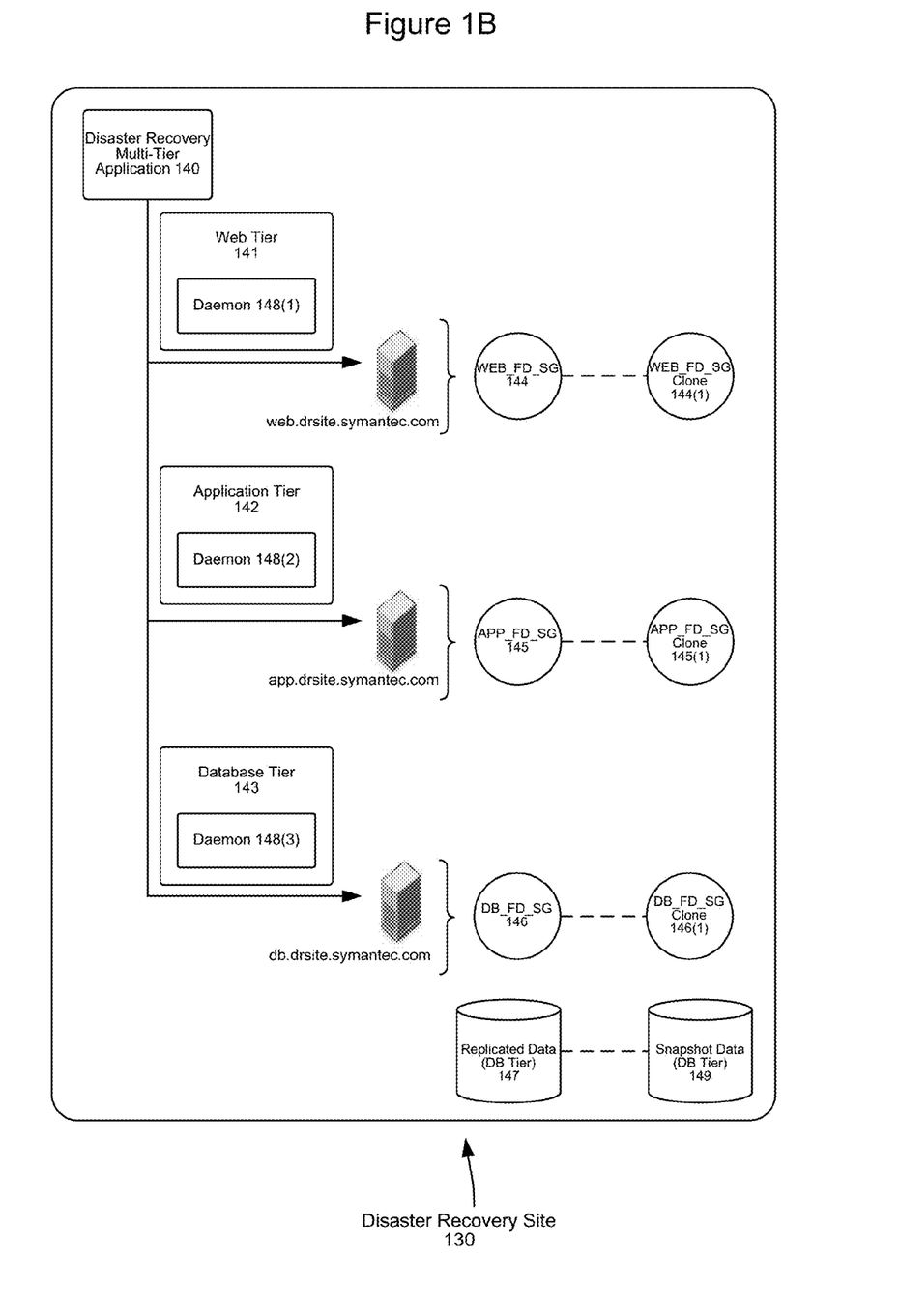
FIG. 1B is a block diagram showing additional details of the secondary (e.g., disaster recovery) site depicted in FIG. 1.

In one embodiment, as depicted in FIG. 1B, disaster recovery multi-tier application 130 also contains three tiers (i.e., the same number of tiers as production site 110)—in this example, Web Tier 141, Application Tier 142, and Database Tier 143. As was the case with production site 110, each of these tiers on disaster recovery site 130 can also include, among other things, a daemon or script, such as daemons 148(1), 148(2), and 148(3). Each of these tiers also includes a service group that corresponds to the service groups described in relation to production multi-tier application 120.

In other embodiments having different tiers and/or configurations, the service groups on the secondary (e.g., disaster recovery or "sandbox") site would correspond to whatever service groups are in use on the primary (e.g., production) site.

Also depicted in FIG. 1B is replication data 147, which in this example is data that was replicated from production Database Tier 123. In other embodiments, any secondary (e.g., disaster recovery, or "sandbox") site tier may have replication data associated with it, where each set of replication data is data replicated from the corresponding primary (e.g., production) site tier. As will be discussed in more detail elsewhere herein, FIG. 1B also depicts clones of each of the disaster recovery service groups, as well as a snapshot (e.g., point-in-time copy) of replicated data 149.

Additionally, although not depicted in FIG. 1 or FIG. 1B, each of the secondary (e.g., disaster recovery) site tiers may be implemented on a cluster of nodes, or a tier may be implemented on a single node. However, even though a secondary site (and especially a disaster recovery site) must contain tiers that correspond to the tiers on the primary (e.g., production) site that are being backed up by the secondary site, each of those disaster recovery tiers may nevertheless include more or less nodes than are included in the corresponding tier on the corresponding primary (e.g., production) site. Moreover, the secondary site may have other purposes beyond serving as a backup to a primary site, such as, e.g., serving as a backup site to a different primary site, and/or serving as a primary site for another multi-tier application. As a result, the secondary site may have additional tiers (or other aspects, features, functionality, etc.) that is not present on the primary site.

Returning again to FIG. 1, network 150 couples production site 110 to disaster recovery site 130. Network 150 allows for communication between production site 110 and disaster recovery site 130 (or, in other embodiments, a second site other than disaster recovery site 130), including the transfer of data between those sites. Network 150 can also allow for communication between any primary site and any secondary site, regardless of their specific configurations, usages, and purposes. Network 150 thereby allows for replication (among other actions) to take place between any two sites connected via the network. Although FIG. 1 depicts network 150 as directly connecting only the database tiers, traffic from other tiers may nevertheless flow over network 150, and other networks (similar to network 150) may connect different tiers in certain embodiments. Moreover, in certain embodiments, multiple networks may exist between the tiers/nodes on the production site and the tiers/nodes on the secondary site (e.g., disaster recovery site 130). As will be discussed in more detail elsewhere, FIG. 1 also depicts Firewall 160, which can be used to create network isolation and regulate data transfer between a primary site (e.g., production site 110) and a secondary site (e.g., disaster recovery site 130).

Production site 110 can host web page(s), application(s), database(s) and other content (collectively, "content"). In one embodiment, one or more tiers of production site 110 can contain content that can be downloaded by one or more user computers (such as, e.g., user computers 170(1)-170(N)) via the Internet or an intranet 180. Using production multi-tier application 120 as an example, production Web Tier 121 contains content that can be downloaded by a user's computer, such as user computers 170(1)-170(N). Production Web Tier 121 could contain, for example, a web page or application that can be downloaded to a user's computer and then run locally on that user's computer. Production Web Tier 121 could be generally accessible to any users with an internet/intranet connection, or may be accessible only to users that have permission to access the production site (e.g., via a password, IP address, required credentials, or any other verification method).

The letter N is used to indicate a variable number of devices or components. For example, a variable number of user computers are implemented in the system described above. Although the letter N is used in describing a variable number of instances of various and occasionally different devices and components, a repeated use of the letter N does not necessarily indicate that each device and/or component has a same number of N instances implemented in any given system.

One or more tiers of production site 110 can also contain content used to facilitate communication between a user's computer and the other tiers of a multi-tier application. Using production multi-tier application 120 as an example, Web Tier 121 may contain content that can be accessed by user computers 170(1)-170(N) and can communicate with user computers 170(1)-170(N). In one embodiment, Application Tier 122 can be an application server running on production site 110. Web Tier 121 can be directly accessed by one or more of user computers 170(1)-170(N) via Internet/intranet 180, and can communicate with Application Tier 122 to serve the desired content to user computers 170(1)-170(N). Application Tier 122 can also facilitate the reception and processing of data received from one or more of user computers 170(1)-170(N). Further, Application Tier 122 can also facilitate communication between Web Tier 121 and Database Tier 123, including communication between content associated with either of those tiers. In certain embodiments, Application Tier 122 can also be used to facilitate communication between user computers 170(1)-170(N) and Database Tier 123.

Additionally, production site 110 may contain one or more tiers that are not directly accessible by a user. However, those tier(s) contain content that can be received from, communicated to, or otherwise interact with a user's computer, such as user computers 170(1)-170(N). In one embodiment, Database Tier 123 contains a database and related software and functionality. The database can be any type of database, and the related software can be any type of software capable of being used with a database. In one embodiment, Database Tier 123 can communicate directly with Application Tier 122 to provide data to, and receive data from, Web Tier 121. In that embodiment, however, Database Tier 123 may not be able to communicate directly (i.e., without going through Application Tier 122) with Web Tier 121.

A secondary site (e.g., disaster recovery site 130) is not generally available to user computers 170(1)-170(N). However, a secondary site (e.g., disaster recovery site 130) can be made available to user computers 170(1)-170(N) if a primary site (e.g., production site 110) fails for any reason (e.g., "crashes" or otherwise goes offline or is taken offline). For example, if production site 110 fails, the system may be designed to "fail over" to disaster recovery site 130. When the system "fails over" to disaster recovery site 130, all traffic will then be routed to disaster recovery site 130. From the perspective of an end user, such as user computers 170(1)-170(N), this transition should be seamless (or as close to seamless as possible in the situation). Thus, disaster recovery site 130 must be able to provide the functionality of production site 110, including, at least, the functionality of production multi-tier application 120 and each of the tiers contained therein.

Accordingly, the tiers of the multi-tier application on the disaster recovery site should correspond to, and be able to perform the functions of, the tiers of the multi-tier application on the production site. In one embodiment, disaster recovery site 130 contains secondary (or disaster recovery) multi-tier application 140, which in turn contains Web Tier 141, Application Tier 142, and Database Tier 143. In this embodiment, these tiers are comparable to the corresponding tiers on the production site 110, as those tiers are described elsewhere herein. Disaster recovery site 130 is communicatively coupled to production site 110 through network 150, which can be any type of network capable of transferring data.

Importantly, many other configurations of production multi-tier application may exist. The examples given herein are intended only as examples to facilitate the discussion contained in this disclosure. In practice, the production multi-tier application may contain more (or less) than three tiers, may contain at least one tier not expressly discussed herein, and may exclude one or more of the tiers that are discussed herein. The tiers included in the production multi-tier application may communicate with each other in a manner other than the manner(s) specifically described herein, whether directly or indirectly. While these variations also apply to the secondary (e.g., disaster recovery) multi-tier application, the secondary (e.g., disaster recovery) multi-tier application should nevertheless function in the same general manner as the production multi-tier application regardless of the configuration of the production multi-tier application. Thus, the secondary (e.g., disaster recovery) site can have different tiers and configurations than those described herein, but should nevertheless have the same tiers and configurations as the primary (e.g., production) site that the secondary (e.g., disaster recovery) site is backing up. This requirement helps ensure that the production multi-tier application may be "failed over" to the secondary (e.g., disaster recovery) site without any material change in functionality.

Also depicted in FIG. 1 is Firewall 160. Firewall 160 does not need to be active and operative at all times, but can and should be invoked when needed (e.g., during testing of disaster recovery site 130, or while the secondary site is being used as a virtual "sandbox" (e.g., for training personnel, and/or for testing of new software, hardware, configurations, etc.)). As will be discussed in more detail herein, Firewall 160 prevents certain data from being transferred between a primary site (e.g., production site 110) and a secondary site (e.g., disaster recovery site 130) during testing or other use of the secondary site. Firewall 160 may also selectively allow certain data to be transferred between a primary site (e.g., production site 110) and a secondary site (e.g., disaster recovery site 130) even when Firewall 160 is in place. Among other benefits, this functionality prevents data on a primary site (e.g., production site 110) from accidentally being corrupted, changed, or deleted during testing or other usage of a secondary site (e.g., disaster recovery site 130).

Figure 5:
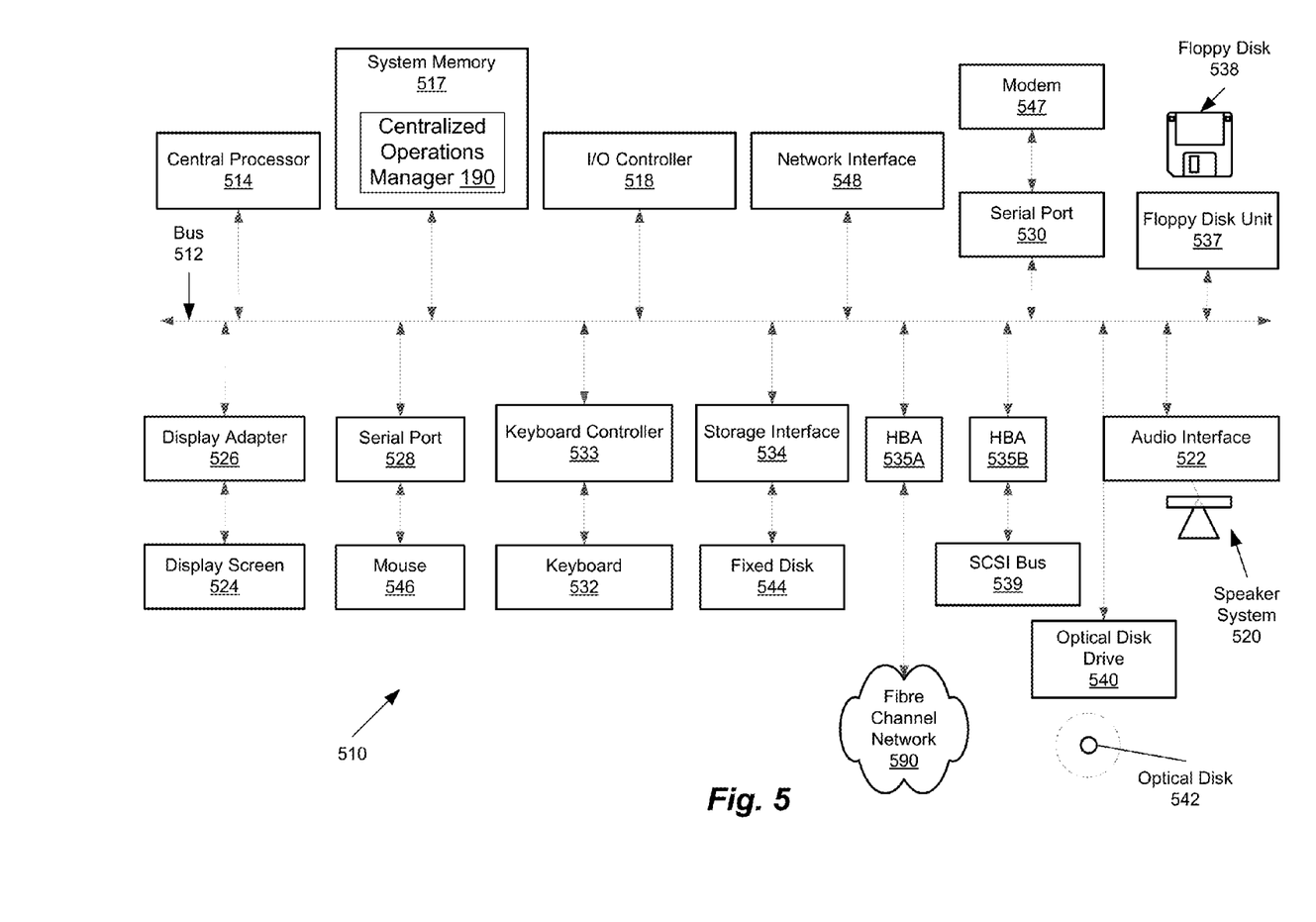
FIG. 5 is a block diagram of a computing device, illustrating how certain features of the invention disclosed herein can be implemented in software, according to one embodiment of the present invention.
Figure 6:
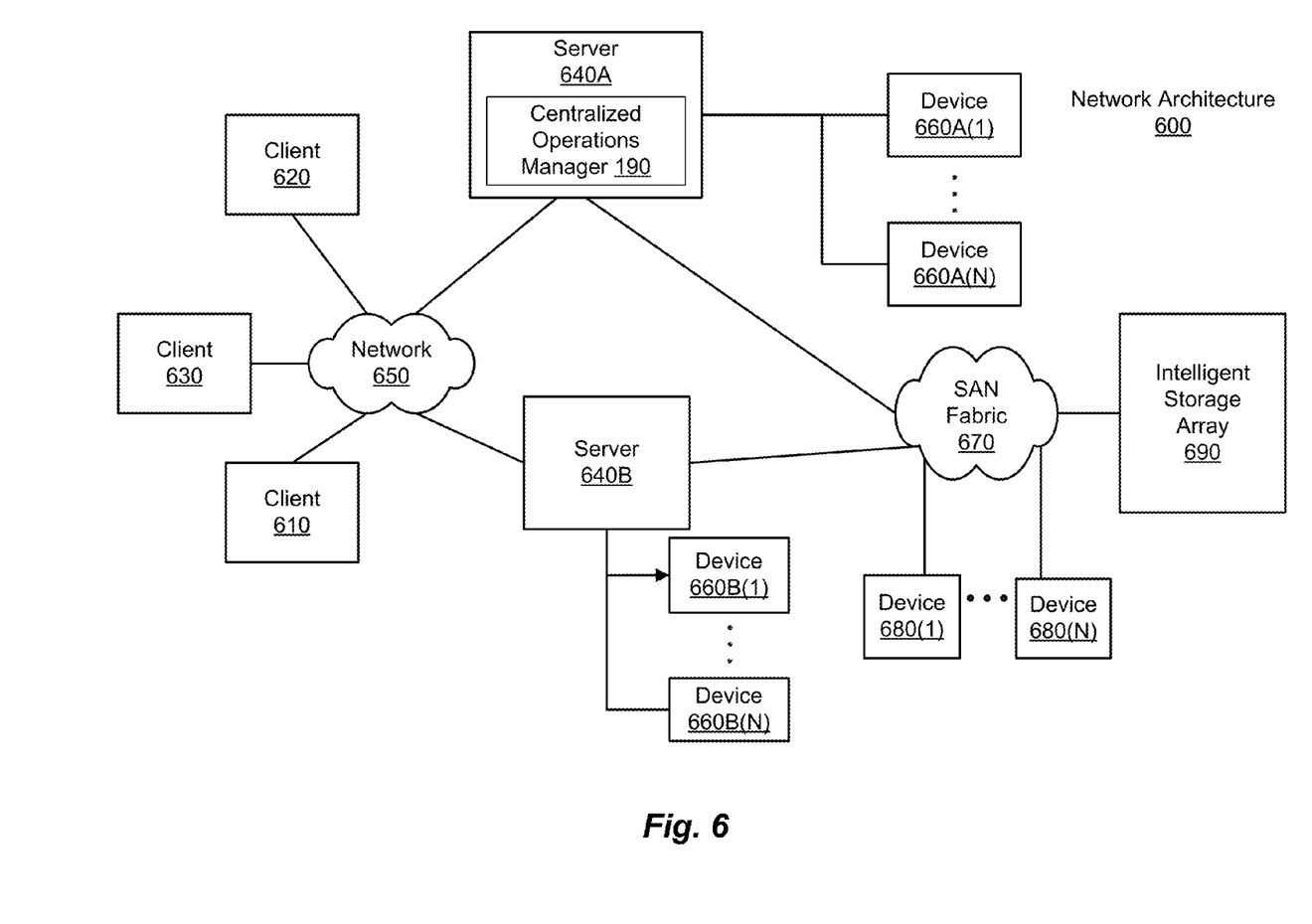
FIG. 6 is a block diagram of a networked system, illustration how various computing devices can communicate via a network, according to one embodiment of the present invention.

FIG. 1 also depicts centralized operations manager 190. As will be described in more detail below, centralized operations manager 190 can be used in one embodiment to perform various functions related to the invention disclosed herein, including, e.g., collecting, storing, and pushing network parameters from production site 110 to disaster recovery site 130 (or any other secondary site). At least some of the operations of centralized operations manager 190 can be facilitated by software such as VERITAS Operations Manager®, available from Symantec Corporation of Mountain View, Calif. Centralized operations manager 190 may itself include daemons, scripts, and/or other processes (such as daemon 191) used to collect, store and push network parameters, and/or used to perform other functionality. Centralized operations manager 190 may include additional or alternate software (e.g., server 640A); and may also be implemented directly in hardware (e.g., any type of computer or computing device, any type of computer chip, etc.) including, e.g., system memory 517. In one embodiment, centralized operations manager 190 may be split among various hardware devices or hardware components, such as, e.g., server 640A, a second server (such as, e.g., server 640B), and system memory 517. In one embodiment, more than one centralized operations managers may be used.

Further, the connections shown in the Figures included herein are for illustration purposes only, and other configurations are possible. For example, while connections are shown between production site 110, disaster recovery site 130, and user computers 170(1)-170(N) are shown in relation to FIG. 1, these connections are for illustration purposes only and that other connection configurations are possible (with respect to FIG. 1, as well as the other Figures, discussions contained herein, and other configurations related to this invention). For example, one or more of the production tiers may be physically outside but coupled to the primary site represented by production site 110; the same is also true for the disaster recovery tiers (or other tiers on a secondary site, e.g., "sandbox" tiers). Similarly, replicated data 147 and snapshot data 149 may be logically and/or physically separated from a secondary site (e.g., disaster recovery site 130).

Configuring and Running a Disaster Recovery Readiness Test

Figure 2:
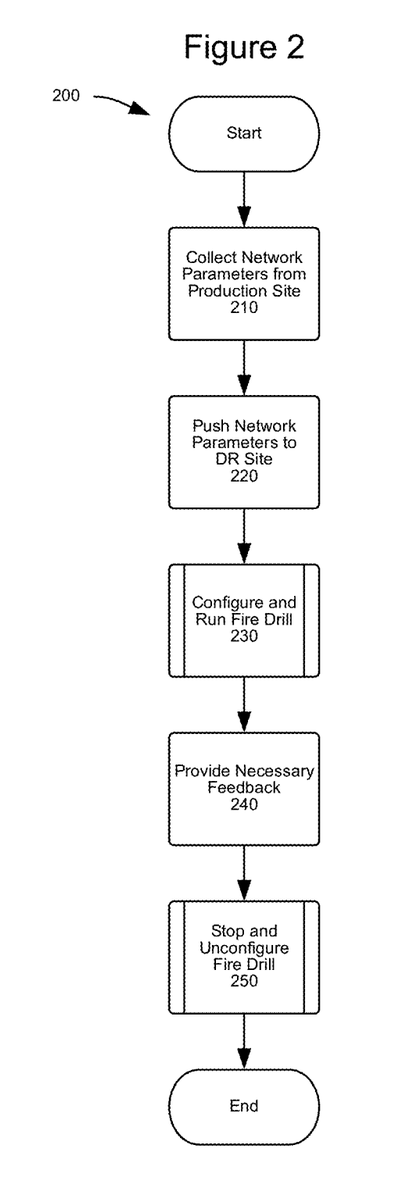
FIG. 2 is a flowchart that illustrates actions that can be performed as part of a disaster recovery test (i.e., "fire drill"), according to one aspect of this invention.

FIG. 2 illustrates actions that can be performed during a disaster recovery readiness test (i.e., "fire drill"), and which can also be applied to achieve other purposes (e.g., "sandbox" testing or training). Thus, although this invention is explained herein primarily in reference to its applicability to disaster recovery testing, the invention should not be viewed as being limited to disaster recovery testing. As mentioned above, the network isolation (e.g., firewall) aspect of this invention can be applied to many other ends, including, e.g., the virtual "sandbox" testing or training referenced herein. While the steps may not have identical names, the general functionality would remain largely the same (e.g., sandbox service groups can be used in place of disaster recovery service groups, which are discussed below). Unless noted otherwise, the steps discussed below can be applied to different contexts (e.g., training or other testing) without hindering the functionality of the invention described herein, particularly with respect to the network isolation (e.g., firewall) aspect of the invention.

In one embodiment, focusing on the disaster recovery testing aspect of this invention, a disaster readiness test begins by configuring the disaster recovery site to perform the test at 210. As shown in 210, configuring disaster recovery site 130 (or another secondary site) to perform the test may begin by collecting network parameters (e.g., e.g., parameters that define how the different tiers or nodes of a primary site, such as production site 110, communicate with other tiers or nodes, including tiers and nodes that are completely external to the system described herein) from production site 110. For example, the network parameters can include Intrusion Prevention System (IPS) parameters, Internet Protocol (IP) addresses, virtual IP addresses ("Virtual IPs"), host names, and virtual host names of the tiers and/or nodes of production multi-tier application 120, among other potential network parameters.

In one embodiment the network parameters can be collected and stored by a centralized operations manager, such as centralized operations manager 190. In one embodiment, the process of collecting the network parameters can include using the daemons or scripts (such as daemons 128(1), 128(2), and 128(3)) on the production tiers to push or otherwise provide the parameters to the centralized communication module, prior to sending those network parameters to a secondary site (e.g., disaster recovery site 130). Once the network parameters are collected, the network parameters can then be pushed or otherwise provided in 220 to the daemons (such as daemons 148(1), 148(2), and 148(3)) running on a secondary site (e.g., disaster recovery site 130).

Once the network parameters have been provided to the secondary (e.g., disaster recovery) site, operation 230 configures and runs a test (e.g., fire drill, other testing or training, etc.). Either during the test or upon completion of the test, the testing software may provide feedback to a user (e.g., a system administrator, database administrator, personnel involved in training, personnel involved in testing and configuring (or re-configuring) a site or portion thereof, etc.) or directly to the system at 240. Upon completion of the test, operation 250 stops and unconfigures the fire drill (or sandbox, other testing, or other application). Operations 230, 240, and 250 will be discussed in greater detail in conjunction with other of the Figures included herein.

Figure 3:
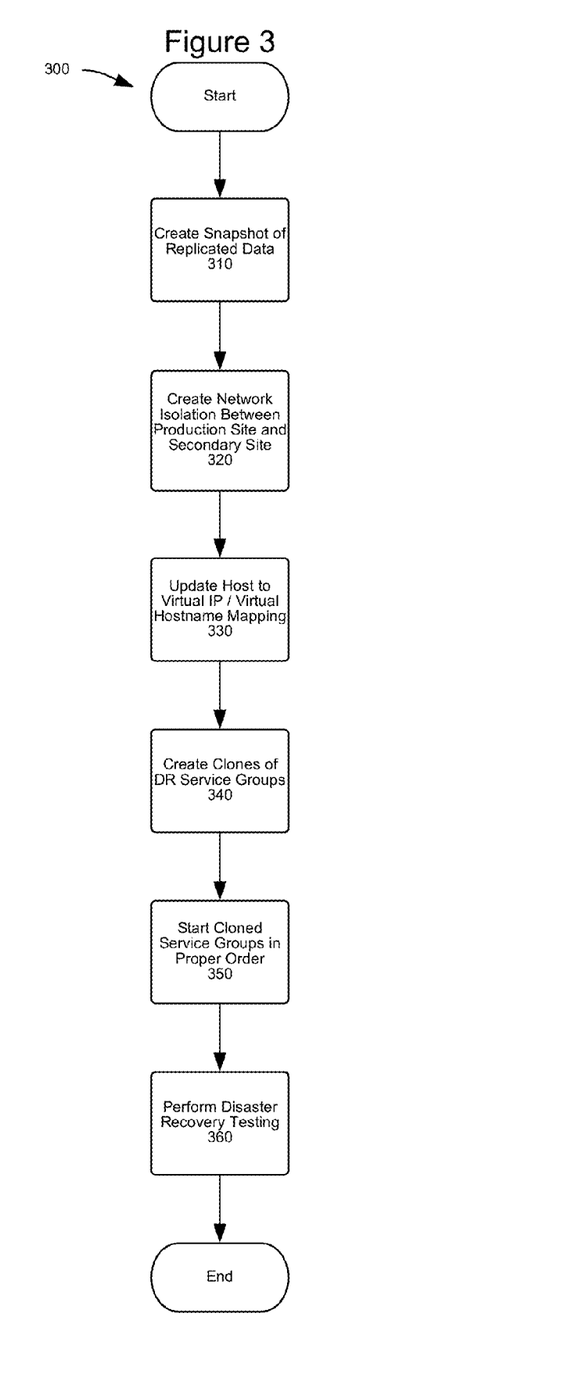
FIG. 3 is a flowchart of a method for performing disaster recovery testing, according to one embodiment of the present invention.

FIG. 3 is a flowchart illustrating method 300, which includes actions that can be performed in configuring and running a test or other operation, such as, e.g., disaster recovery readiness test 230. In one embodiment, the test (or other operation) begins by creating a point-in-time snapshot of the replicated data ("snapshot data") at 310. The replicated data itself is a copy of data associated with a primary site, such as production site 110, and replicated data would exist for any production site tier(s) that have replication. Replication can be performed, e.g., using a synchronous, asynchronous, or periodic technique. In one embodiment, a commercially-available storage replicator may be used to perform the replication, such as VERITAS Volume Replicator® available from Symantec Corporation of Mountain View, Calif.

Among other things, replication ensures that secondary site (e.g., disaster recovery site 130) is always in a consistent state (i.e., a state that actually exists or existed at the production site) relative to the production site. Thus, the replicated data itself must not be changed by the testing process, and must also be available to be updated by the replication process during the testing. Particularly in the context of disaster recovery readiness testing (or other testing or training being performed on a disaster recovery site), these measures help to ensure that accurate and up-to-date replicated data is available to a disaster recovery site if the need to "failover" from a production site occurs during the testing. Thus, the snapshot data (e.g., the point-in-time copy of the replicated data, which is itself a copy of data from a production site) of the replicated data is created and used for the test (including sandbox testing or training, or other applications using any aspect(s) of the invention discussed herein). Using the snapshot data for the test helps protect the integrity of both the "live" data on a production site and the replicated data on a secondary (e.g., disaster recovery or sandbox) site. In one embodiment, the snapshot of the replicated data is created by daemons on secondary (e.g., disaster recovery or sandbox) site tiers, such as daemons 148(1), 148(2), and 148(3).

The replicated data and the snapshot data can be stored on a secondary (e.g., disaster recovery) site, or in any storage medium communicatively coupled to a secondary (e.g., disaster recovery) site 130. The replicated data and the snapshot data may be stored in a non-transient data storage medium that is physically and/or logically distinct from a secondary site (e.g., disaster recovery site 130). Moreover, the replicated data and/or the snapshot do not have to be stored in the same non-transient data storage medium, nor do they need to be stored on the same physical or logical device as each other. Many different types of non-transient data storage mediums may be used, such as, for example, hard drives, RAM, ROM, flash memory, solid state memory, RAID devices, and optical storage devices.

In addition to protecting the replicated data from any inadvertent modification during the testing, another critical consideration is the desire to eliminate any risk of "cross-talk" between the primary site (e.g., production site 110) and the secondary site (e.g., disaster recovery site 130) during the testing. "Cross-talk" can be thought of as inadvertent communication between a tier or node on one site (e.g., disaster recovery site 130) and a tier or node on another site (e.g., production site 110). For example, during the testing, various simulated clients (e.g., WEB_FD_SG 144, discussed below) may perform transactions that involve modifying snapshot data 149. In order to maintain the integrity of both the primary (e.g., production site 110) and secondary (e.g., disaster recovery site 130) sites, none of these transactions should affect any data but the data intended to be affected, e.g., snapshot data 149. To achieve this, the firewall should prevent any testing activity from being inadvertently communicated to a primary site (e.g., production site 110).

In order to eliminate any risk of such "cross-talk" between the tiers running on the primary (e.g., production) site tiers and the tiers running as part of the fire drill testing (or other testing, training, or uses) on the disaster recovery site, network isolation 320 is created between a primary (e.g., production) site and a secondary (e.g., disaster recovery) site. This network isolation may be accomplished by invoking a firewall, such as Firewall 160. Firewall 160 can be created by any existing network utilities or other appropriate software.

In one embodiment, Firewall 160 may be invoked by the daemons or scripts on the secondary (e.g., disaster recovery) site, such as daemons 148(1), 148(2), and 148(3). Additionally, Firewall 160 may be invoked by a centralized operations manager, such as centralized operations manager 190. As indicated above, centralized operations manager 190 may be implemented in software or may be directly implanted in hardware, such as, e.g., a computing device or a computer chip, among other pieces of hardware), which may reside on a primary (e.g., production) site, a secondary (e.g., disaster recovery) site, or as hardware and/or software operating on a computer system that is physically distinct from either of those sites. In one embodiment, the network isolation (e.g., Firewall 160) is created between the primary site tiers and the secondary site tiers using host-based firewall rules on the secondary tier hosts (e.g., the site where the fire drill application will be brought online).

Firewall 160 can be configured to prevent any communication between the primary (e.g., production) site tiers and the secondary (e.g., disaster recovery) site tiers during the test that would cause the testing to affect the primary (e.g., production) site, or to prevent any communication from the primary (e.g., production) site that would affect the test. However, in order to ensure that the ability to failover the production multi-tier application is not compromised during the fire drill, Firewall 160 is generally configured to allow replication to continue to occur between a primary site (e.g., production site 110) and a secondary site (e.g., disaster recovery site 130) during the testing (or other operations on the secondary site)—although, importantly, this replication should not affect the snapshot data to be used during the testing. This can be accomplished, e.g., by ensuring that any necessary replication ports are kept open while the network isolation/firewall (e.g., Firewall 160) is in use. Thus, the network isolation/firewall (e.g., Firewall 160) can be configured to allow data to be transferred among any replication ports in use at the secondary (e.g., disaster recovery) and primary (e.g., production) sites, even during testing. In general, the configuration of the network isolation/firewall (e.g., Firewall 160) can be customized to allow selected data be transferred across a firewall (e.g., Firewall 160) during a fire drill (or other testing or usage), while prohibiting other data from being transferred across a firewall (e.g., Firewall 160). This customized configuration may be based on various criteria for selecting the data that can be transferred across a firewall (e.g., Firewall 160), such as, e.g., specific nodes, specific ports, the originating location of the data (e.g., Web Tier 121, Application Tier 122, or Database Tier 123), the type of data, and the time at which the data was created.

Additionally, a firewall (e.g., Firewall 160) may be configured such that the network isolation changes are only applied to those nodes (that are part of a given disaster recovery tier) on the secondary (e.g., disaster recovery) site that are running the testing (or training, etc.) application. For example, if disaster recovery (or, e.g., sandbox) Database Tier 143 is a four-node cluster, the network isolation changes are applied only to the host where the database fire drill service group (DB_FD_SG, which is discussed in more detail below, or the clone thereof) is running. Although not depicted in FIG. 3, the "fire drill service groups" can also be different types of service groups, such as, e.g., "sandbox service groups." The specific naming convention is not important to the efficacy or functionality of the invention(s) described herein.

Although network isolation is used to prevent cross-talk between primary (e.g., production site) tiers and secondary (e.g., disaster recovery) site tiers, the secondary (e.g., disaster recovery) site tiers must be able to communicate with each other during the fire drill or other testing/usage of the secondary (e.g., disaster recovery) site. The secondary (e.g., disaster recovery) site tiers must also be able to communicate with each other in other situations that may arise, such as if the need to failover the production site arises during the testing of the disaster recovery site. This communication is enabled at 330 by updating a host to virtual IP/virtual host name mapping table ("mapping table") to enable the secondary (e.g., disaster recovery) site tiers to communicate with each other using hostnames. Use of this mapping table removes the need for any dependency on a domain name server (DNS) that is external to the secondary (e.g., disaster recovery) site, which in turn reduces the likelihood of the testing (or other usage) affecting, or being affected by, the ongoing operation of the primary (e.g., production) site.

As one example of how the mapping table can be used, consider the host names used by production site 110 and disaster recovery site 130. For example, production Web Tier 121 may have a hostname of web.prodsite.symantec.com, production Application Tier 122 may have a hostname of app.prodsite.symantec.com, and production Database Tier 123 may have a hostname of db.prodsite.symantec.com. The mapping table could be used to map these hostnames to the appropriate corresponding name for the disaster recovery tiers. In this example, this mapping would include mapping the production site subdomain ("prodsite," in this example) to the subdomain for the disaster recovery site ("drsite," in this example). Thus, using this same example, the mapping table could be used to indicate that disaster recovery Web Tier 141 has a hostname of web.drsite.symantec.com, disaster recovery Application Tier 142 may have a hostname of app.drsite.symantec.com, and disaster recovery Database Tier 143 may have a hostname of db.drsite.symantec.com. By mapping the hostnames accordingly, any potential dependence on an external DNS is eliminated. Doing so, in turn, helps protect the integrity of the disaster recovery site and the test itself, by preventing any "accidental" communications (e.g., a communicated intended for app.drsite.symantec being inadvertently routed to app.prodsite.symantec.com) between the disaster recovery tiers and the production site tiers (or different tiers and/or differently-named tiers in other embodiments).

To further protect the integrity of the production site as well as the site being tested (e.g., the disaster recovery site), clones of the service groups can be used to prevent modification to the actual application configuration. Operation 340 creates a clone (e.g., identical or substantially identical copy) of the multi-tier application configuration on secondary (e.g., disaster recovery) site 130. In one embodiment, daemons (such as daemons 148(1)-(3)) on the secondary (e.g., disaster recovery) site tiers will create clones of the service groups on the secondary (e.g., disaster recovery) site tiers. In one embodiment, the clones can be the fire drill service groups created by VERITAS Cluster Server ("VCS"), available from Symantec Corporation of Mountain View, Calif. As depicted in FIG. 1B, these cloned service groups may be named, for example, WEB_FD_SG Clone 144(1), APP_FD_SG Clone 142(1) and DB_FD_SG Clone 143(1).

The cloned service groups provide the same functionality as the secondary (e.g., disaster recovery, sandbox, or other) service groups for each of the tiers on the secondary (e.g., disaster recovery site), and do so without having to use the secondary service groups themselves during the testing. Performing the testing in this manner prevents any accidental modifications to the actual secondary (e.g., disaster recovery) service groups. To further help ensure that the actual secondary (e.g., disaster recovery) service groups are not inadvertently accessed or modified during the testing, one embodiment of the invention can ensure that the cloned secondary (e.g., disaster recovery) service groups are not running (or otherwise in operation or being used) while the actual secondary (e.g., disaster recovery) service groups are running (or otherwise in operation or being used). The secondary (e.g., disaster recovery) service groups themselves must not be changed during the testing, both to ensure the validity and accuracy of the test, as well as to ensure that those service groups are ready for use should the need to failover the production site arise during the testing of a disaster recovery site (e.g., disaster recovery site 130).

Once the network isolation has been established and the cloned service groups have been created, the cloned service groups are then started in the proper order at 350. In one embodiment, this order is determined by resolving the dependencies among the tiers of disaster recovery multi-tier application 130. For instance, DB_FD_SG Clone 146(1) would be started first in this example because the Application Tier 142 and Web Tier 141 are dependent on Database Tier 143 (including snapshot data 149), but Database Tier 143 is not dependent on either of those other tiers. In this same example, APP_FD_SG Clone 145(1) would be started after DB_FD_SG Clone 146(1) because Application Tier 142 is dependent on Database Tier 143. However, APP_FD_SG Clone 145(1) would have to be started before cloned WEB_FD_SG 144(1) is started since Web Tier 141 is dependent on Application Tier 142. Determining these dependencies among the tiers of the multi-tier applications ensures that the respective service groups are started in the correct order, which in turn ensures that data integrity is maintained and further ensures that the system works properly.

After starting the cloned service groups, a user (or an automated process) can perform the actual test of the secondary (e.g., disaster recovery) site's readiness to respond in the case where a failover is needed, or where the secondary (e.g., disaster recovery) site must otherwise be brought online for any reason. The testing will be performed using the cloned service groups and the snapshot data. Performing the testing in this manner ensures that no unintentional changes are made to the actual secondary (e.g., disaster recovery) site or replicated data. Accordingly, the validity of the testing is ensured, and the method of testing is non-disruptive to both the primary (e.g., production) site and any secondary (e.g., disaster recovery) site(s). Thus, the secondary (e.g., disaster recovery) site(s) will still be available for use should the need for a failover arise during the testing.

As depicted in FIG. 2, either during or upon completion of the testing, the results of the test can be reported 240. In one embodiment, the results can be reported directly to a user (e.g., a site administrator), who can then make any necessary changes to the configuration of the disaster recovery site if any portion of the test failed. In one embodiment, any errors detected during the testing can be submitted to an automated process, which can make any necessary changes to the disaster recovery site configuration if any portion of the test failed. In other embodiments, different types of results could be reported. For instance, if the invention was being used as a "sandbox" to train a new employee, the results of that employee's performance on the "test" could be reported. Alternatively, if the invention was being used as a "sandbox" to test a new configuration (e.g., a new configuration of a primary site, prior to rolling out that configuration to a live production site), the results of that test could be reported as well. As these examples indicate, the results of the test can be reported in a wide variety of formats, for a wide variety of purposes, and to a wide variety of users, depending on the situation and the needs and desires of the users of this invention.

In case of a failure on a primary site (e.g., production site 110) during the fire drill (or other testing or usage), a user can stop the activity (e.g., testing, training, etc.) on the secondary site and then bring disaster recovery multi-tier application 130 online on disaster recovery site 130. This invention also allows for an active-active disaster recovery readiness test. Thus, while the fire drill (or other testing or use) is being performed on a secondary site (e.g., disaster recovery site 130), that secondary site (e.g., disaster recovery site 130) can simultaneously be executing other multi-tier applications (not discussed or depicted herein) that do not need to communicate with the primary site (e.g., production site 110). Thus, in one embodiment, disaster recovery site 130 may simultaneously serve as the disaster recovery site for other primary (e.g., production) sites not discussed or depicted herein, or even serve as a production site for another multi-tier application. The ability for those other production sites to operate and, if needed, fail over to a secondary site (e.g., disaster recovery site 130) would not be compromised during the testing discussed herein.

Figure 4:
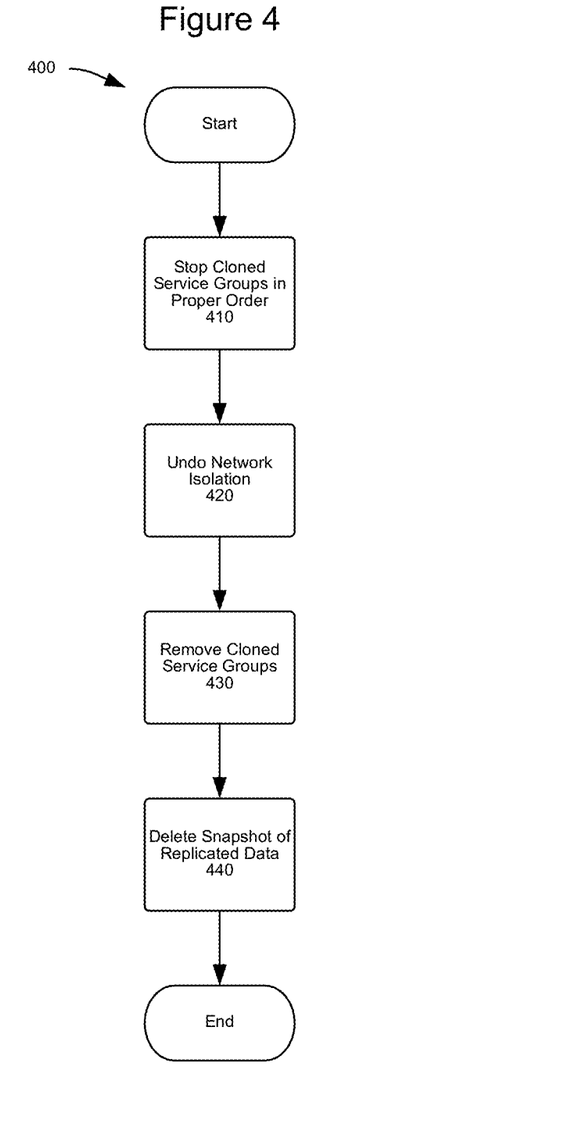
FIG. 4 is a flowchart of a method for stopping a disaster recovery test, according to one embodiment of the present invention.

FIG. 4 is a flowchart illustrating method 400, which discloses actions performed to stop and unconfigure the fire drill (or other testing or other usage) in element 240. Method 400 begins by stopping the cloned service groups in the proper order at 410. As a general matter, the service groups should be stopped in the reverse of the order in which they were started. Thus, referring back to the example given above, WEB_FD_SG Clone 144(1) would be stopped first, followed by APP_FD_SG Clone 145(1), and finally DB_FD_SG Clone 146(1) would be stopped last. As was the case when starting the cloned service groups in the correct order, stopping the cloned service groups in the correct order also helps to ensure data integrity and also helps to prevent errors by stopping each tier only after all of the other tiers that depend on it (either directly or indirectly) have been stopped.

Once the cloned service groups have been stopped in 410, method 400 can then undo the network isolation 420. Importantly, the network isolation cannot be undone until all of the cloned service groups have first been stopped in 410. Performing these steps in this order helps to ensure that none of the cloned service groups have the opportunity to inadvertently communicate with any of the service groups of the production site and/or with the original service groups of the replication site. Such inadvertent communication could result in a host of undesirable issues with respect to the production and disaster recovery sites, including data corruption and potentially even crashing the production and/or disaster recovery site.

Method 400 then proceeds to step 430, in which the cloned service groups are removed. Finally, method 400 concludes with step 440, in which the snapshot of the replicated data may be cleared. In certain embodiments, however, the snapshot of the replicated data may also be retained (e.g., for use in a future test) without having a negative effect on the overall process(es) and system(s) described herein. Steps 430 and 440 help to ensure that both the primary (e.g., production) site and the secondary (e.g., disaster recovery) site are in their pre-testing state (or, if the replicated data is retained, in a presently-desired state), and are ready to continue on with their normal functionality (or a future test, e.g.).

An Example Computing Environment

As shown above, the systems described herein can be implemented using a variety of computer systems and networks. Examples of such computing and network environments are described below with reference to FIGS. 5 and 6.

FIG. 5 depicts a block diagram of a computer system 510 suitable for implementing aspects of the systems described herein. Computer system 510 includes a bus 512 which interconnects major subsystems of computer system 510, such as a central processor 514, a system memory 517 (typically RAM, but which may also include ROM, flash RAM, or the like), an input/output controller 518, an external audio device, such as a speaker system 520 via an audio output interface 522, an external device, such as a display screen 524 via display adapter 526, serial ports 528 and 530, a keyboard 532 (interfaced with a keyboard controller 533), a storage interface 534, a floppy disk drive 537 operative to receive a floppy disk 538, a host bus adapter (HBA) interface card 535A operative to connect with a Fibre Channel network 590, a host bus adapter (HBA) interface card 535B operative to connect to a SCSI bus 539, and an optical disk drive 540 operative to receive an optical disk 542. Also included are a mouse 546 (or other point-and-click device, coupled to bus 512 via serial port 528), a modem 547 (coupled to bus 512 via serial port 530), and a network interface 548 (coupled directly to bus 512).

Bus 512 allows data communication between central processor 514 and system memory 517, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Centralized operations manager 190 may be embedded, encoded, or otherwise stored in or on system memory 517. Applications resident with computer system 510 are generally stored on and accessed from a computer-readable storage medium, such as a hard disk drive (e.g., fixed disk 544), an optical drive (e.g., optical drive 540), a floppy disk unit 537, or other computer-readable storage medium.

Storage interface 534, as with the other storage interfaces of computer system 510, can connect to a standard computer-readable medium for storage and/or retrieval of information, such as a fixed disk drive 544. Fixed disk drive 544 may be a part of computer system 510 or may be separate and accessed through other interface systems. Modem 547 may provide a direct connection to a remote server via a telephone link or to the Internet via an internet service provider (ISP). Network interface 548 may provide a direct connection to a remote server via a direct network link to the Internet via a POP (point of presence). Network interface 548 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 5 need not be present to practice the systems described herein. The devices and subsystems can be interconnected in different ways from that shown in FIG. 5. The operation of a computer system such as that shown in FIG. 5 is readily known in the art and is not discussed in detail in this application. Code to implement the modules of the systems described herein can be stored in computer-readable storage media such as one or more of system memory 517, fixed disk 544, optical disk 542, or floppy disk 538. The operating system provided on computer system 510 may be MS-DOS®, MS-WINDOWS®, UNIX®, Linux®, AIX®, or another operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

An Example Networking Environment

FIG. 6 is a block diagram depicting a network architecture 600 in which client systems 610, 620 and 630, as well as storage servers 640A and 640B (any of which can be implemented using computer systems 610, 620, and/or 630), are coupled to a network 650, which can be the same network as Internet/intranet(s) 180 and/or network 150. Storage server 640A is further depicted as having storage devices 660A(1)-(N) directly attached, and storage server 640B is depicted with storage devices 660B(1)-(N) directly attached. Additionally, storage server 640A is depicted as containing centralized operations manager 190. While not expressly depicted in FIG. 6, it is understood that centralized operations manager 190 may be included on any storage server, such as storage server 640B, and may also be split among one or more servers, such as storage servers 640A and 640B. Storage servers 640A and 640B are also connected to a SAN fabric 670, although connection to a storage area network is not required for operation. SAN fabric 670 supports access to storage devices 680(1)-(N) by storage servers 640A and 640B, and so by client systems 610, 620 and 630 via network 650. Intelligent storage array 690 is also shown as an example of a specific storage device accessible via SAN fabric 670.

With reference to computer system 510, modem 547, network interface 548 or some other method, apparatus or device can be used to provide connectivity from each of client computer systems 610, 620 and 630 to network 650. Client systems 610, 620 and 630 are able to access information on storage server 640A or 640B using, for example, a web browser or other client software (not shown). Such a client allows client systems 610, 620 and 630 to access data hosted by storage server 640A or 640B or one of storage devices 660A(1)-(N), 660B(1)-(N), 680(1)-(N) or intelligent storage array 690. FIG. 6 depicts the use of a network such as the Internet for exchanging data, but the systems described herein are not limited to the Internet or any particular network-based environment.

The systems described herein are well adapted to attain the advantages mentioned as well as others inherent therein. While such systems have been depicted, described, and are defined by reference to particular descriptions, such references do not imply a limitation on the claims, and no such limitation is to be inferred. The systems described herein are capable of considerable modification, alteration, and equivalents in form and function, as will occur to those ordinarily skilled in the pertinent arts in considering the present disclosure. The depicted and described embodiments are examples only, and are in no way exhaustive of the scope of the claims.

The foregoing describes embodiments including components contained within other components (e.g., the various elements shown as components of computer system 510). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the systems described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a non-transitory machine-readable or non-transitory computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media, including any such type of non-transitory computer-readable storage media, may be used to store the modules discussed herein.

The above description is intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the systems described herein have been described in connection with several embodiments, these embodiments and their descriptions are not intended to be limited to the specific forms set forth herein. On the contrary, it is intended that such embodiments address such alternatives, modifications, and equivalents as can be reasonably included within the scope of the appended claims.

What is claimed is:

1. A method comprising:
   replicating data from a production site to a secondary site, wherein
      the secondary site is configured with a secondary multi-tier application, and
      the secondary multi-tier application is a copy of a primary multi-tier application executing on the production site;
   configuring a firewall to provide network isolation between the primary multi-tier application and the secondary multi-tier application, wherein
      the configuring the firewall allows the replicating to occur between the production site and the secondary site while the network isolation is ongoing; and
   testing the secondary multi-tier application, wherein the testing comprises
      testing the secondary multi-tier application while the replicating is ongoing.

2. The method of claim 1, wherein the configuring the firewall further comprises
   configuring the firewall to allow the secondary site to perform one or more operations that are not part of the testing, wherein
   the one or more operations are performed during the testing.

3. The method of claim 1, further comprising
   using one or more daemons on the production site to collect one or more parameters from the production site, wherein
      the one or more daemons collect the one or more parameters prior to the configuring the firewall.

4. The method of claim 3, further comprising
   providing the one or more parameters to one or more daemons on the secondary site, wherein
      the providing occurs prior to the configuring the firewall.

5. The method of claim 1, further comprising
updating a hostname mapping table, wherein
the hostname mapping table is stored on the secondary site prior to the testing, and
the hostname mapping table is used during the testing.

6. The method of claim 1, further comprising
creating a clone of one or more service groups, wherein
each clone corresponds to a service group on the secondary site,
each clone corresponds to a service group on the production site, and
the creating the clone of each of the one or more service groups is performed prior to the testing.

7. The method of claim 1, further comprising
stopping the testing prior completion of the testing, wherein
the stopping is performed in response to detecting a failure related to the production site; and
bringing the secondary site online in response to the detecting the failure.

8. A non-transitory computer-readable storage medium configured to store program instructions that, when executed on a processor, are configured to cause the processor to perform a method comprising:
replicating data from a production site to a secondary site, wherein
the secondary site is configured with a secondary multi-tier application, and
the secondary multi-tier application is a copy of a primary multi-tier application executing on the production site;
configuring a firewall to provide network isolation between the primary multi-tier application and the secondary multi-tier application, wherein
the configuring the firewall allows the replicating to occur between the production site and the secondary site while the network isolation is ongoing; and
testing the secondary multi-tier application, wherein the testing comprises
testing the secondary multi-tier application while the replicating is ongoing.

9. The non-transitory computer-readable storage medium of claim 8, wherein the configuring the firewall further comprises:
configuring the firewall to allow the secondary site to perform one or more operations that are not part of the testing, wherein
the one or more operations are performed during the testing.

10. The non-transitory computer-readable storage medium of claim 8, wherein the method further comprises:
using one or more daemons on the production site to collect one or more parameters from the production site, wherein
the one or more daemons collect the one or more parameters prior to the configuring the firewall.

11. The non-transitory computer-readable storage medium of claim 10, wherein the method further comprises:
providing the one or more parameters to one or more daemons on the secondary site, wherein
the providing occurs prior to the configuring the firewall.

12. The non-transitory computer-readable storage medium of claim 8, wherein the method further comprises:
updating a hostname mapping table, wherein
the hostname mapping table is stored on the secondary site prior to the testing, and
the hostname mapping table is used during the testing.

13. The non-transitory computer-readable storage medium of claim 8, wherein the method further comprises:
creating a clone of one or more service groups, wherein
each clone corresponds to a service group on the secondary site,
each clone corresponds to a service group on the production site, and
the creating the clone of each of the one or more service groups is performed prior to the testing.

14. The non-transitory computer-readable storage medium of claim 8, wherein the method further comprises:
creating a clone of one or more service groups, wherein
each clone corresponds to a service group on the secondary site,
each clone corresponds to a service group on the production site, and
the creating the clone of each of the one or more service groups is performed prior to the performing the test.

15. The non-transitory computer-readable storage medium of claim 8, wherein the method further comprises:
stopping the testing prior completion of the testing, wherein
the stopping is performed in response to detecting a failure related to the production site; and
bringing the secondary site online in response to the detecting the failure.

16. A computer system comprising:
a processor; and
a memory coupled to the processor and configured to store instructions executable by the processor, the instructions configured to
replicate data from a production site to a secondary site, wherein
the secondary site is configured with a secondary multi-tier application, and
the secondary multi-tier application is a copy of a primary multi-tier application executing on the production site;
configure a firewall to provide network isolation between the primary multi-tier application and the secondary multi-tier application, wherein
the firewall is configured to allow the data to be replicated between the production site and the secondary site while the network isolation is ongoing; and
test the secondary multi-tier application, wherein the test comprises
testing the secondary multi-tier application while the data is being replicated.

17. The computer system of claim 16, wherein
the firewall is further configured to allow the secondary site to perform one or more operations that are not part of the test, and
the one or more operations are performed during the test.

18. The computer system of claim 16, wherein the instructions are further configured to use one or more daemons on the production site to collect one or more parameters from the production site, wherein
the one or more daemons collect the one or more parameters prior to the firewall being configured.

19. The computer system of claim 16, wherein the instructions are further configured to update a hostname mapping table, wherein
the hostname mapping table is stored on the secondary site prior to the test, and
the hostname mapping table is used during the test.

20. The computer system of claim 16, wherein the instructions are further configured to create a clone of one or more service groups, wherein
- each clone corresponds to a service group on the secondary site,
- each clone corresponds to a service group on the production site, and
- the clone of each of the one or more service groups is created prior to the test.

* * * * *